Patented Jan. 31, 1928.

1,657,731

UNITED STATES PATENT OFFICE.

ERNEST E. WEMP, OF DETROIT, MICHIGAN.

CLUTCH.

Application filed July 17, 1924. Serial No. 726,447.

This invention relates to clutches and has for its object a simple, effective and cheap clutch design which is more especially intended for a "single plate" clutch.

It is one of the objects of this invention to eliminate the driving pins which are ordinarily set in the fly wheel. The clutch design is such that these pins are located in the clutch cover plate and the packing ring, so that they are part of the clutch assembly. This is an important feature for it permits the control of the dimensions and the tolerances to be wholly within control of the clutch manufacturer. Where the driving pins are located in the fly wheel, the fly wheels are controlled and the pins put in place by the automobile manufacturer. Consequently the accuracy and care with which these parts are located with respect to the other parts is out of the control of the manufacturer of the clutch, hence satisfactory installations are not always secured by reason of two parties being responsible for the complete installation.

This and other features will be more fully described after a detailed description of the parts is given.

In the drawings:

Fig. 3 is a section taken on the line 3—3 of Fig. 1.

Fig. 4 is a detail in perspective of one of the hardened driving collars.

Fig. 5 is a diagram of the forces which counterbalance the lever.

Figure 1:
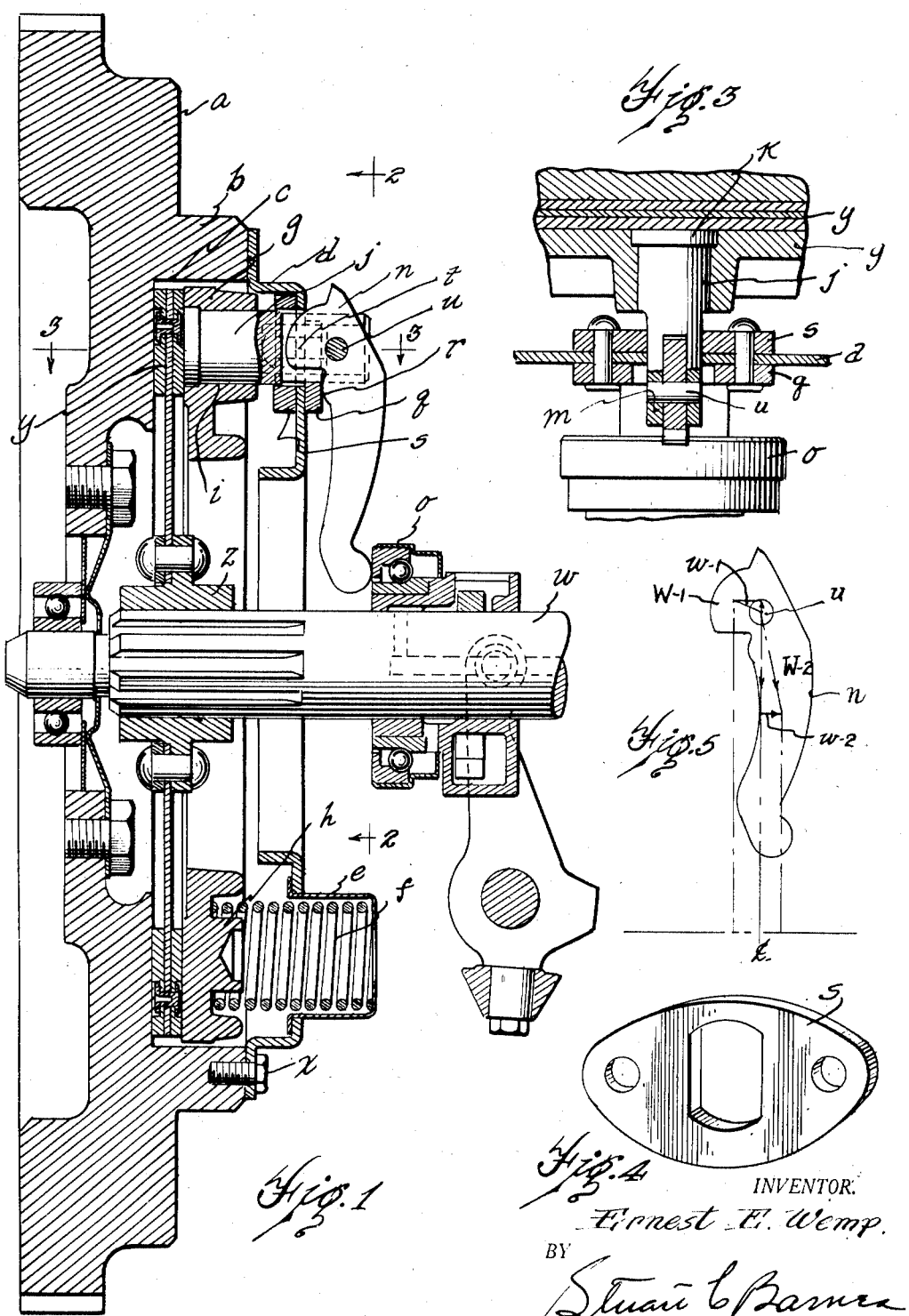
Fig. 1 is a longitudinal section through the clutch.
Figure 2:
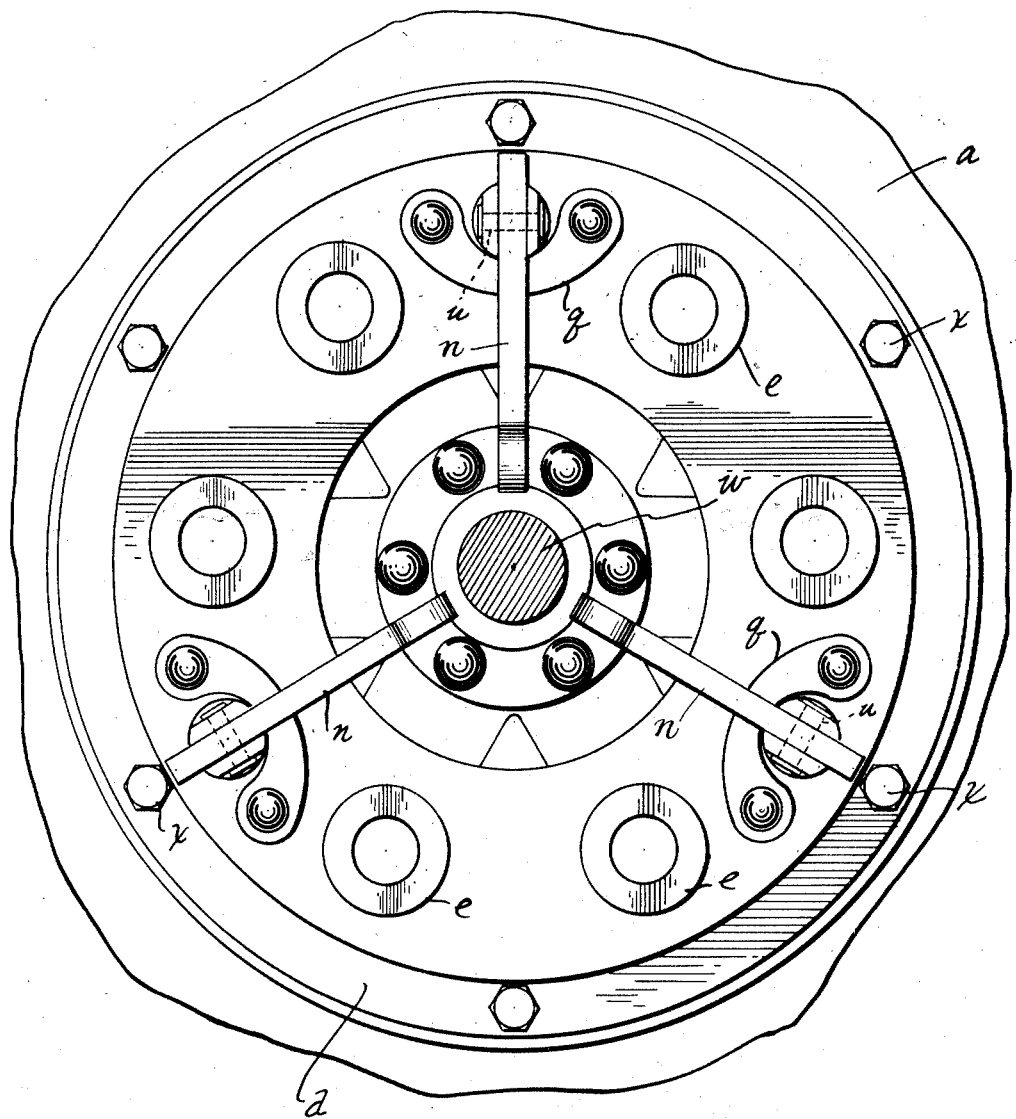
Fig. 2 is an elevational view taken on the line 2—2 of Fig. 1.

$a$ designates the fly wheel which is provided with a rearwardly extending boss $b$, which encircles a clutch cavity $c$, the boss forming part of the clutch housing. Boltable to this boss is a cover plate $d$ which is provided with spring cup inserts $e$ which partially house the coil springs $f$ which exert a direct spring pressure on the cast metal packing ring $g$. This packing ring is provided with suitable spring-centering-bosses $h$. It is also provided with perforations $i$ through which slidably engage the studs or pins $j$. These studs are of special construction as shown in Fig. 3; the forward end of the studs being shouldered as at $k$ and the rear ends of the studs being bifurcated and also flattened as at $m$. In the bifurcation slot engages a counter-balanced pressure-relieving lever $n$. The inner ends of these levers engage with the clutch thrust collar $o$. Each lever is provided with a small rocker $r$ which engages with the fulcrum block $q$. On the inside of the plate is a case-hardened driving collar $s$ which engages with the flattened portion of the stud $k$; the stud and the collar are both case hardened, so that the driving effort transmitted through them does not materially wear the parts, also the fulcrum block and the lever may be hardened where they contact, thereby preventing wear.

The lever has an inwardly projecting portion $t$ which is a counterweight to balance the centrifugal forces. The center of gravity of the lever on the inside of the pivot $u$ is slightly to the rear of a perpendicular line drawn from the center of the pin $u$ to the driven shaft $w$, hence in the diagram of forces (Fig. 5) there is a small component tending to rotate the lever about this pin in obedience to centrifugal forces. This small component of forces, however, works on a considerable leverage due to the remoteness of the center of gravity of the lever from the center of the pin $u$.

In order to neutralize this small force component working on a large leverage, I extend the counterweight forward, as shown in Fig. 5, so that the center of mass of the counterweight is nearly at right angles to the centrifugal forces; this results in a relatively larger force component $W^1$ than the force component $W^2$ tending to unbalance the lever. Also this force component $W^1$ is larger, due to the centrifugal force here being greater because of the greater speed of travel on the greater radius. Hence a much smaller weight and projection from the pin is required than would be the case, if the counterweight were in line with the main body of the lever.

From the above description it will be seen that the driving pins that require accurate location and manufacture are all contained in the clutch unit, the different parts of which form a unit assembly. This unit assembly may easily be bolted to the fly wheel by the bolts $x$, and it is not a matter of great moment that these holes may be slightly out of the proper location, for the driving assembly has all the parts properly positioned, dimensioned and manufactured by the clutch maker. The driven member is preferably a single clutch disc $y$ which is mounted on a hub $z$, that is splined on the end of the driven shaft $w$.

It will be obvious that any suitable form of driven disc may be used. It will also be obvious that the packing ring $g$ is a driving disc, as is also the rear face of the fly wheel.

What I claim is:

1. In a clutch associated with a flywheel, the combination of a light metal cover plate provided with a perforation surrounded by a driving collar and a fulcrum block and a driving pin slidably passing through said cover plate and wholly independent of the fly wheel, some of the parts thus related to the cover plate being constructed of hardened metal.

2. In a clutch, the combination of a cover plate provided with a perforation, a hardened driving collar on one side of the cover plate around the perforation and a fulcrum block on the other side of the cover plate around the perforation and a slidable driving pin passing through said perforation and through the collar and block, and serving also as a thrust transmitting member, and a lever pivoted to said pin and fulcruming on the fulcrum block.

3. In a clutch, a lever whose normal disposition is approximately radial from the axis of the clutch, and which is provided with a counterbalancing mass for counteracting the centrifugal forces which mass is part of the lever and is offset substantially perpendicularly from the main line of the lever.

4. In a clutch, the combination of an apertured cover plate, a driving pin passing through said aperture and a lever pivoted to said pin, said lever being counterbalanced by a mass carried on the lever extending approximately perpendicular to the line of the lever.

5. In a clutch, the combination of an apertured cover plate, a collar on one side of the cover plate around the aperture, a driving pin passing through said aperture and collar, and a lever pivoted to said pin, said lever being counterbalanced by a mass extending approximately perpendicular to the line of the lever.

6. In a clutch, the combination of an apertured cover plate, a collar on one side of the cover plate around the aperture, a driving pin passing through said aperture, a balanced lever pivotally mounted on said pin and a fulcruming block for said lever on the other side of said plate.

7. In a clutch, an operative lever of the first order, the general line of disposition of which is approximately radial to the axis of the clutch, the said lever having a forwardly extending mass on its load end which is calculated to substantially counterbalance the centrifugal forces.

In testimony whereof I hereby affix my signature.

ERNEST E. WEMP.